Figure 1:
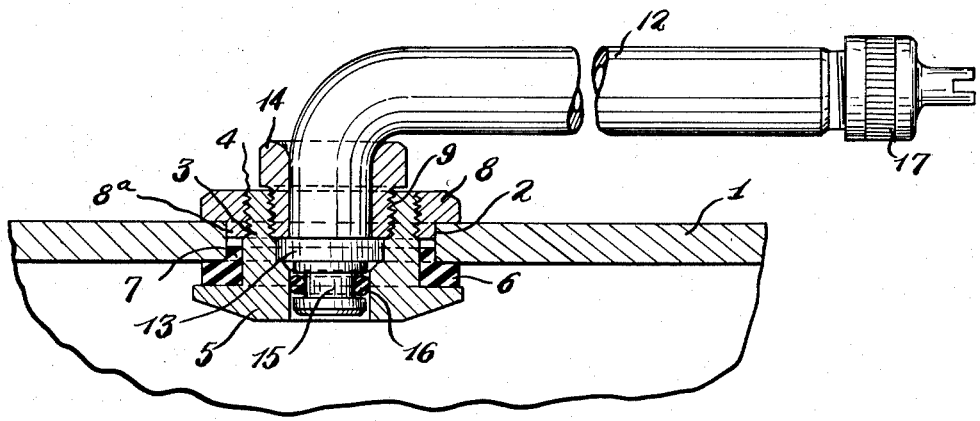

May 20, 1958  R. K. BOYER  2,835,305

TUBELESS TIRE VALVES FOR TRUCKS AND THE LIKE

Filed Jan. 5, 1955

INVENTOR.
RALPH K. BOYER
BY Hudson, Boughton,
Williams, David & Hoffmann
ATTORNEYS

United States Patent Office 2,835,305
Patented May 20, 1958

2,835,305
TUBELESS TIRE VALVES FOR TRUCKS AND THE LIKE

Ralph K. Boyer, Cleveland, Ohio, assignor to The Dill Manufacturing Company, Cleveland, Ohio, a corporation of Ohio Application January 5, 1955, Serial No. 479,920

3 Claims. (Cl. 152—427)

The present invention relates to a valve assembly which is particularly designed for use with tubeless tires of larger size such as are used on trucks, busses, etc. Tires for use with such vehicles as have been mentioned, require in most instances at least, that a bent stem be used so that it will project outwardly beyond the rim of the tire and in convenient position to be engaged by an air chuck for inflation purposes.

Such larger-sized tires as have been mentioned, will vary and they will require the use of stems of varying lengths in accordance with the particular wheel set-up in connection with which they will be required for use.

Where in such types of tires a bent stem valve assembly is conventionally clamped in position upon the rim of the tubeless tire, and it is subsequently desired to use the tire and its rim under such circumstances as would require a different length of stem than that which is already assembled on the rim, it is necessary to dismount the tire and to assemble with respect to the rim a valve assembly which is equipped with a bent stem of the desired length.

An object of the present invention is to provide what might be termed a spud assembly which will be clamped in position upon all tubeless tire rims, in position upon such rim where the tire valve hole through the rim is positioned. Since the diameter of holes in rims to accommodate valve stems is standardized, it is possible to provide a spud arrangement which may be universally applied to all tubeless tire rims and particularly those rims which take the larger size tubless tires, and to provide a bent stem assembly to the spud and secure it in place, and associate with the interior of the bent stem, at the outer end threeof, provisions for receiving and retaining the usual valve insides.

Under the foregoing circumstances, stems may be made in different lengths and carried in stock and a selected stem of the desired length be selected for use in a given situation in accordance with the length of the bent stem which is required.

Figure 2:
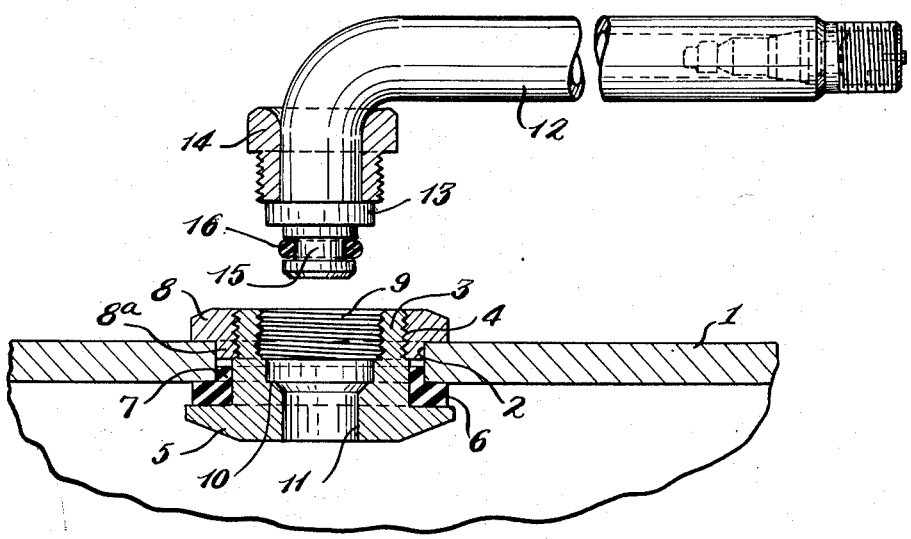

Referring to the drawing,

Fig. 1 is a section with parts in elevation showing a rim with a spud applied thereto and a bent stem associated with the spud; and, Fig. 2 is a sectional elevation with portions in full line showing the separated parts prior to their being attached.

Referring more particularly to the drawing, 1 is a section of a portion of a rim for tubeless tires which is provided with a valve stem opening, the periphery of which is indicated at 2. Associated with this rim and the opening therethrough is a spud which consists of a member 3 which has an outer threaded neck portion 4 and is provided with an extended head portion 5, the member 3 being hollow. Associated with the lower portion of the member 3 and resting upon the head portion 5 is an L-shaped washer member 6. This L-shaped member has the upper portion thereof as indicated at 7, of such diameter as to conveniently fit in the opening 2 and the lower portion of the member 6 extends outwardly beyond the diameter of the opening 2 through the rim. Cooperating with the threaded neck portion 4 of the member 3 is a nut 8 which is provided with an inner shoulder 8a which is of a diameter to fit the hollow 2 in the rim. When the nut 8 is screwed inwardly upon the member 3 the nut 8 engages with the outside portion of the rim and also draws the member 3 upward so that the washer 6 is compressed and forms a seal so that there can be no escape of air from the inner portion of the tire when the same is mounted upon the rim.

An advantage of the construction which has been described is that if the washer member 6 through long use cold flows, it is only necessary to turn the nut member 8 a turn or two in order to again compactly bring the washer 6 into contact with the inner side of the rim and thus complete its packing function.

It has been stated that the member 3 is hollow and provides an upper portion which is interiorly threaded, as indicated at 9, and also provides a shoulder portion 10 which has a function that will be subsequently explained. Then beneath the shoulder 10 there is a cylindrical portion 11 which is of constant diameter.

The valve stem fitting which is to be used in connection with the above described construction is more particularly shown in Fig. 2 and comprises a stem 12 which is provided with a collar 13, and the stem just above the collar 13 has assembled therewith a nut 14 which is threaded upon its exterior surface and is adapted to engage with the inner threaded portion 9 of the spud. The inner end of the stem 12, it being understood that the stem 12 is hollow, is provided with a reentrant shoulder portion 15 and assembled with respect to the shoulder portion is an O-ring 16. The depth of the shoulder portion upon the stem is such as to be but slightly greater that the diameter of the O-ring.

The stem 12 is assembled with respect to the spud by inserting the lower portion of the stem into the spud such that the O-ring 16 occupies in part the cylindrical portion 11 at the lower end of the spud. The external diameter of the O-ring 16 is slightly greater than the diameter of the cylindrical portion 11 so that when the stem is assembled with respect to the spud, as indicated in Fig. 1, the O-ring is under some degree of compression by virtue of its engagement with the wall of the cylindrical portion 11.

When the inner end of the stem is assembled with respect to the spud the collar 13 on the inner part of the stem 12 fits upon the shoulder 10 of the interior of the spud and when the nut 14 is screwed downwardly, the collar 13 is pushed into tight contact with the shoulder 10 and the positioning of the inner end of the stem is very definitely ascertained.

As shown in the drawing, the outer end of the stem 12 is provided with a valve cap 17 which is of usual construction and the inside of the outer portion of the stem 12 is arranged to receive the usual type of valve insides, the structure to which reference has just been made is well-known in the art.

From the foregoing construction it will be seen that employing the present invention to rims for tubeless tires and, particularly, to the larger size of such tires a spud such as is shown more particularly in detached view in Fig. 2, may be provided and then to complete the assembly, a stem 12 of proper size and taken from a set of different lengths of stems may be selected for association with the spud of the particular rim and where the length of stem responds to the conditions under which the tubeless tire is to be used, to thereby position the end of the stem in such place so that it may be readily available for reception of the usual type of air chuck.

The sealing function of the stem with respect to the spud is attained by the metal contact of the collar 13 with the shoulder 10 when the nut 14 is in its tightened position and further, the O-ring by its engagement with the wall of the cylindrical portion 11 also provides an effective and adjacent seal against the escape of air other than through the opening in the stem.

The washer 6 is provided with an upstanding portion and a side extending portion, in other words, it is substantially L-shaped in cross-section. The upstanding portion has an outside diameter such that it will normally fit within the valve stem opening of the rim. The lower portion of the washer member 6 extends outwardly to engage with that portion of the inside surface of the rim which is adjacent the periphery of the valve stem opening in the rim and also engages with the head portion 5 of the spud member 3. When the nut 8 is turned and the spud member is assembled with respect to the rim, as shown in Fig. 2, the portion of the spud member within the valve stem opening engages with the portion of the washer member therewithin and simultaneously engages the head portion 5 of the spud and impinges the washer against the inside surface of the rim adjacent the valve stem opening in the rim. Thus, it will be seen that the washer 6 effectively serves as a packing between the spud member and the inner peripheral wall of the valve stem opening in the rim and also serves as a packing between the inside surface of the rim and the head portion 5 of the spud member 3. This is an important feature of the present feature of the present invention because if there were only a flat washer, the tightening of the parts of the spud member would merely result in squeezing the flat washer such that it would expand laterally and might therefore readily fail as a complete insulation against leakage of air. The same would also be true if there were only a washer within the valve stem opening of the rim and between the peripheral wall of such opening in the spud member 3. The resultant fact is that when the nut 8 is tightened onto the spud member 3 there is an air-tight seal effected between the outer wall of the spud member and the peripheral wall of the valve stem opening, and also between the head portion 5 of the spud member and the inside surface of the rim.

While the invention has been described with particular reference to the details of the construction involved, it will be understood that changes may be made where coming within the scope of the appended claims.

Having thus described my invention, I claim:

1. A valve stem assembly adapted for mounting upon a rim for tubeless tires which rim is provided with a standard valve stem opening, comprising a hollow spud having a plurality of parts in adjustable threaded relationship and mounted in said valve stem opening, one of said parts having an enlarged head extending over the inside surface of the rim surrounding said valve stem opening and another of said parts having a diameter greater than the diameter of said valve stem opening and extending over the outside surface of the rim surrounding the latter, a washer essentially L-shaped in cross-section and having a portion thereof extending between an outer wall of the said one part of the spud and the inner peripheral wall of said valve stem opening, said washer having another portion interposed between the head on said one part and the surface of the rim adjacent the periphery of said valve stem opening, said spud being adjustable to clampingly engage with the washer to provide an air-tight seal between said spud and rim in the valve stem opening and at said last named surface, a hollow valve stem having an end thereof forming a reentrant shoulder portion and projecting into said hollow spud from said outside surface of the rim, an O-ring embracing said reentrant shoulder portion and engaging with the wall of the interior of said hollow spud to provide an air-tight seal between the latter and said valve stem, a nut carried by said stem and in threaded engagement with said spud to retain the stem in assembled relation to the spud, and said stem having means to receive a valve inside.

2. A valve stem assembly adapted for mounting upon a rim for tubeless tires, which rim is provided with a standard valve stem opening, comprising a hollow spud formed of two parts being in an adjustable threaded relationship and mounted in said valve stem opening, one of said parts having an enlarged head extending over the inside surface of the rim surrounding said valve stem opening and the other of said parts having a portion whose diameter is greater than the diameter of said valve stem opening and extending over and engaging with the outside surface of the rim surrounding the latter, a packing member having a portion extending between the outer wall of said one part and the inner peripheral wall of said valve stem opening, said packing member having still another portion interposed between the head on said one part and said inside surface of the rim surrounding the periphery of said valve stem opening, said parts of the spud adapted to be threadingly adjustable to carry said one part into clampable engagement with said packing such as to provide an air-tight seal between said spud and rim in the valve stem opening and at said last named surface, said one part of the hollow spud having an internal cylindrical portion, a shoulder portion adjacent said cylindrical portion, and an internally threaded portion extending outwardly of the outside surface of the rim, a hollow valve stem mounted in said spud, means in said stem for receiving a valve insides, said valve stem having at one end a collar and a re-entrant shoulder portion adjacent said collar, an O-ring occupying said re-entrant shoulder portion, said re-entrant shoulder portion extending within said cylindrical portion of said one part and engaging with the wall thereof, and said collar engaging with the shoulder portion of said one part, a nut mounted upon the end of the stem and in engagement with the collar, said nut being externally threaded and adapted to threadingly engage with the internally threaded portion on said one part of the spud, whereby in assembled position the collar on the valve stem is forced into engagement with said shoulder portion on said one part of the spud and the O-ring is positioned within the cylindrical portion of said spud to provide an air-tight seal between the latter and said valve stem.

3. A valve stem assembly adapted for mounting upon a rim for tubeless tires which rim is provided with a standard valve stem opening, comprising a hollow spud mounted in said opening and having an internal threaded portion adjacent to the outside surface of the rim and a cylindrical portion which cylindrical portion has a shoulder, a packing washer disposed between the outer wall of said spud and the inner peripheral wall of said valve stem opening and including a portion in engagement with the inside surface of said rim surrounding the valve stem opening and seated between said surface and the end of said spud opposite to said internally threaded portion, said spud being externally threaded on its one end and threadingly engageable with a nut whereby said spud is effective to engage the packing washer to provide an air-tight seal between said spud and rim in the valve stem opening and at said rim surface, a hollow angular valve stem mounted in said spud, one end of said stem being provided with an extension having a collar engaging with the shoulder in said cylindrical portion of said spud, a nut encircling the extension above said collar and having an externally threaded portion adapted to be threadingly engageable with the internally threaded portion on said spud, whereby the collar is firmly held in a metal-to-metal engagement with said shoulder to form an air-tight seal therebetween, and means cooperating between the cylindrical portion of the spud and the lower end of the valve stem extension to form an air-tight seal therebetween.

References Cited in the file of this patent

UNITED STATES PATENTS

| | | |
|---|---|---|
| 913,265 | Coppage | Feb. 23, 1909 |
| 2,481,404 | Donner | Sept. 6, 1949 |
| 2,563,787 | Keefe | Aug. 7, 1951 |
| 2,685,907 | Waddell | Aug. 10, 1954 |
| 2,731,065 | Powers | Jan. 17, 1956 |